(12) United States Patent
Tamashiro et al.

(10) Patent No.: US 11,981,442 B2
(45) Date of Patent: May 14, 2024

(54) AERIAL VEHICLE SAFETY APPARATUS AND METHOD OF ACCOMMODATING EXPANDABLE OBJECT IN AERIAL VEHICLE SAFETY APPARATUS

(71) Applicant: NIPPON KAYAKU KABUSHIKI KAISHA, Tokyo (JP)

(72) Inventors: Akihiro Tamashiro, Tokyo (JP); Takahiro Ooi, Tokyo (JP); Maiko Fukumoto, Tokyo (JP)

( * ) Notice: Subject to any disclaimer, the term of this patent is extended or adjusted under 35 U.S.C. 154(b) by 28 days.

(21) Appl. No.: 17/755,385

(22) PCT Filed: Oct. 23, 2020

(86) PCT No.: PCT/JP2020/040016
§ 371 (c)(1),
(2) Date: Apr. 28, 2022

(87) PCT Pub. No.: WO2021/085352
PCT Pub. Date: May 6, 2021

(65) Prior Publication Data
US 2022/0340289 A1 Oct. 27, 2022

(30) Foreign Application Priority Data

Oct. 31, 2019 (JP) .................................. 2019-198941

(51) Int. Cl.
*B64D 17/72* (2006.01)
*B64C 39/02* (2023.01)
(Continued)

(52) U.S. Cl.
CPC ............. *B64D 17/72* (2013.01); *B64D 17/80* (2013.01); *B64C 39/024* (2013.01); *B64U 70/83* (2023.01)

(58) Field of Classification Search
CPC ...... B64D 17/72; B64D 17/725; B64D 17/80; B64D 17/62; B64D 17/54; B64D 17/58; B64U 70/83
See application file for complete search history.

(56) References Cited

U.S. PATENT DOCUMENTS 1,291,762 A * 1/1919 Calthrop ................ B64D 17/80
244/147
1,776,629 A * 9/1930 Kugler .................. B64D 17/54
244/147
(Continued)

FOREIGN PATENT DOCUMENTS

CN 204507255 U 2/2015
CN 204507255 U 7/2015
(Continued)

OTHER PUBLICATIONS

ISR; Japan Patent Office; Dec. 22, 2020.
ESR: European Patent Officel Oct. 2, 2023.

*Primary Examiner* — Joshua J Michener
*Assistant Examiner* — Arfan Y. Sinaki
(74) *Attorney, Agent, or Firm* — Patshegen IP; Moshe Pinchas

(57) ABSTRACT

An aerial vehicle safety apparatus includes a piston member, a cylinder that accommodates the piston member and is provided with a hole through which the piston member protrudes outward at time of operation, a push-up member that is pushed up in one direction by the piston member, an expandable object that is pushed up while being supported by the push-up member, a gas generator as a power source that moves the piston member in the cylinder, and a first member and a second member that serve as a cylindrical container that accommodates the piston member, the cylinder, the push-up member, the expandable object, and the gas (Continued)

generator. The expandable object is stored in the container so as to form a plurality of layers in a radial direction.

6 Claims, 8 Drawing Sheets

(51) Int. Cl.
*B64D 17/80* (2006.01)
*B64U 70/83* (2023.01)

(56) References Cited

U.S. PATENT DOCUMENTS

| | | | |
|---|---|---|---|
| 1,823,799 A | 9/1931 | Friedrich | |
| 2,940,703 A | 6/1960 | Lent | |
| 3,926,391 A * | 12/1975 | Nordine | B64D 17/725 |
| | | | 244/149 |
| 2016/0221681 A1 | 8/2016 | Babovka et al. | |

FOREIGN PATENT DOCUMENTS

| | | | | |
|---|---|---|---|---|
| CN | 206654200 U | | 11/2017 | |
| CN | 206704527 U | | 12/2017 | |
| EP | 3050805 A1 | | 8/2016 | |
| EP | 3050805 B1 | | 8/2016 | |
| JP | 2003-154020 A | | 5/2003 | |
| JP | 2020001680 A | * | 1/2020 | ............ B64D 17/72 |
| JP | 2020075687 A | * | 5/2020 | ............ B64D 17/72 |
| JP | 2020078973 A | * | 5/2020 | ............ B64D 17/72 |
| JP | 2020125012 A | * | 8/2020 | ............ B64D 17/72 |
| JP | 2021070425 A | * | 5/2021 | ............ B64D 17/72 |
| KR | 10-1723743 B1 | | 4/2017 | |
| WO | 2019/039062 A1 | | 2/2019 | |

* cited by examiner

AERIAL VEHICLE SAFETY APPARATUS AND METHOD OF ACCOMMODATING EXPANDABLE OBJECT IN AERIAL VEHICLE SAFETY APPARATUS

TECHNICAL FIELD

The present invention relates to an aerial vehicle safety apparatus that ejects an expandable object such as a parachute, and relates to a method of accommodating the expandable object in the aerial vehicle safety apparatus.

BACKGROUND ART

In recent years, with the development of an autonomous control technology and a flight control technology, an industrial use of an aerial vehicle provided with a plurality of rotor blades called a drone, for example, has been accelerating. The drone flies, for example, by simultaneously rotating a plurality of rotor blades in a well-balanced manner, ascends and descends by increasing or decreasing a rotation speed of the rotor blades, and can advance and retreat by tilting an airframe by increasing or decreasing the rotation speed of the rotor blades. Such aerial vehicles are expected to spread worldwide in the future.

Meanwhile, the risk of fall accidents of the aerial vehicles as described above is considered to be dangerous and hinders spread of the aerial vehicles. In order to reduce the risk of such fall accidents, parachute apparatuses for aerial vehicles have been commercialized as safety devices.

As a parachute aerial vehicle safety apparatus for the aerial vehicle parachute apparatus, for example, Patent Literature 1 discloses a parachute folded vertically from a bottom to an opening of a container so as to be overlapped.

CITATION LIST

Patent Literature

Patent Literature 1: EP 3050805 B

SUMMARY OF INVENTION

Technical Problems

The parachute aerial vehicle safety apparatus as described in Patent Literature 1 is required to be further reduced in size and weight.

Therefore, an object of the present invention is to provide an aerial vehicle safety apparatus with a simple configuration capable of smoothly and quickly expanding an expandable object such as a parachute at time of expansion as in a related art and capable of being reduced in size and weight as compared with the related art.

Solutions to Problems (1) An aerial vehicle safety apparatus of the present invention includes an expandable object configured to hold air inside during expansion, a container that accommodates the expandable object in an initial state, a hat-shaped member provided in the container and including a columnar member and a flange provided at one end of the columnar member, and an ejection apparatus that ejects the hat-shaped member and the expandable object from inside of the container to outside of the container at time of operation, in which in the initial state, the expandable object is accommodated in the container while being folded into layers including at least a first layer configured by arranging the expandable object to be positioned at a predetermined position of the columnar member with one end of the expandable object as a starting end from a state in which the expandable object is collected into an elongated shape, extending the expandable object around the columnar member along a peripheral surface of the columnar member from the starting end to the one end of the expandable object by one round, and forming a terminal end, and a second layer configured by folding back the expandable object from the terminal end of the first layer to overlap an outer side of the first layer, further extending the expandable object around the first layer along a peripheral surface of the first layer by one round to reach one end of the first layer, and layering the expandable object on the first layer in a radial direction.

(2) An aerial vehicle safety apparatus according to another aspect of the present invention may include an expandable object configured to hold air inside during expansion, a container that accommodates the expandable object in an initial state, a hat-shaped member provided in the container and including a columnar member and a flange provided at one end of the columnar member, and an ejection apparatus that ejects the hat-shaped member and the expandable object from inside of the container to outside of the container at time of operation, in which in the initial state, the expandable object is accommodated in the container while being folded into layers including at least a first layer configured by arranging the expandable object to be positioned at a predetermined position on the flange with one end of the expandable object as a starting end from a state in which the expandable object is collected into an elongated shape, extending the expandable object on the flange by one round about the columnar member from the starting end, and forming a terminal end, and a second layer configured by folding back the expandable object from the terminal end of the first layer to overlap the first layer on an opposite side of the flange, further extending the expandable object around the columnar member by one round along a surface of the first layer to reach one end of the first layer, and layering the expandable object on the first layer in a direction opposite to the flange.

In a configuration according to (1) or (2), it is possible to provide an aerial vehicle safety apparatus with a simple configuration capable of smoothly and quickly expanding an expandable object such as a parachute at time of expansion as in a related art and capable of being reduced in size and weight as compared with the related art.

(3) In the aerial vehicle safety apparatus according to (1) or (2), a coupling member coupled to a body of the aerial vehicle or the container is preferably connected to the expandable object, and the coupling member, in the initial state, is preferably bundled in a bellows shape or a substantially figure-of-eight shape and is placed on the flange or in the expandable object being folded.

In a configuration according to (3), the coupling member can be smoothly pulled out when the expandable object is ejected at the time of operation.

(4) The present invention is a method of accommodating an expandable object in an aerial vehicle safety apparatus including an expandable object configured to hold air inside during expansion, a container that accommodates the expandable object in an initial state, a hat-shaped member provided in the container and including a columnar member and a flange provided at one end of the columnar member, and an ejection apparatus that ejects the hat-shaped member and the expandable object from inside of the container to outside of the container at time of operation, the method including at least forming a first layer by arranging the expandable object to be positioned at a predetermined position on the flange with one end of the expandable object as a starting end from a state in which the expandable object is collected into an elongated shape, extending the expandable object on the flange by one round about the columnar member from the starting end, and forming a terminal end, and forming a second layer by folding back the expandable object from the terminal end of the first layer to overlap an outer side of the first layer, further extending the expandable object around the first layer by one round along a peripheral surface of the first layer to reach one end of the first layer, and layering the expandable object on the first layer in a radial direction.

(5) Another aspect of the present invention may be a method of accommodating an expandable object in an aerial vehicle safety apparatus including an expandable object configured to hold air inside during expansion, a container that accommodates the expandable object in an initial state, a hat-shaped member provided in the container and including a columnar member and a flange provided at one end of the columnar member, and an ejection apparatus that ejects the hat-shaped member and the expandable object from inside of the container to outside of the container at time of operation, the method including at least forming a first layer by arranging the expandable object to be positioned at a predetermined position on the flange with one end of the expandable object as a starting end from a state in which the expandable object is collected into an elongated shape, extending the expandable object on the flange by one round about the columnar member from the starting end, and forming a terminal end, and after forming the first layer, forming a second layer by folding back the expandable object from the terminal end of the first layer to overlap the first layer on an opposite side of the flange, further extending the expandable object around the columnar member by one round along a surface of the first layer to reach one end of the first layer, and layering the expandable object on the first layer in a direction opposite to the flange.

A configuration according to (4) or (5) facilitates manufacturing of an aerial vehicle safety apparatus, with simple steps, capable of smoothly and quickly expanding an expandable object such as a parachute at time of expansion as in a related art and capable of being reduced in size and weight as compared with the related art.

FIRST EMBODIMENT

Hereinafter, an aerial vehicle safety apparatus according to a first embodiment of the present invention will be described with reference to the drawings.

Figure 1:
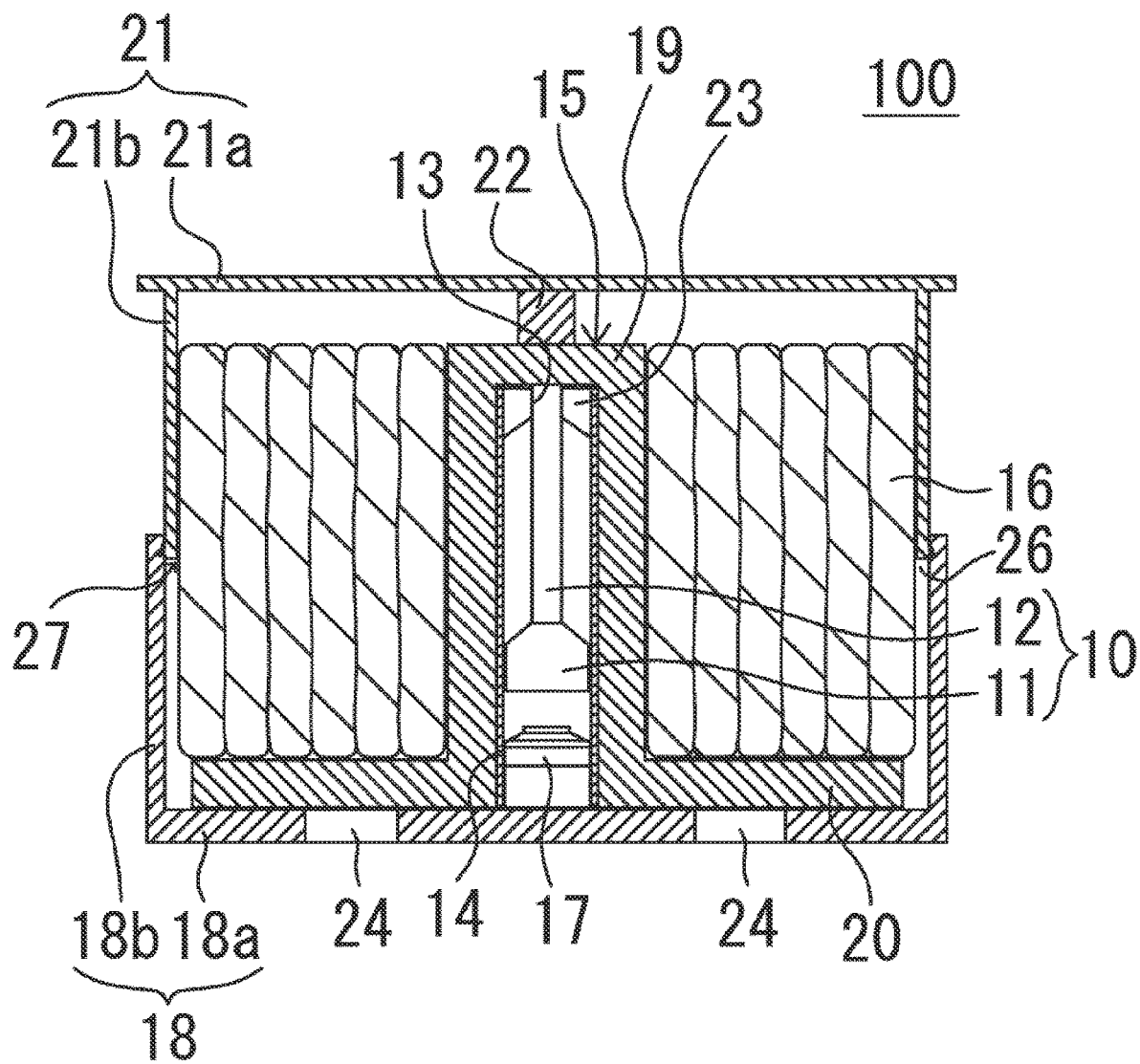
FIG. 1 is a schematic sectional view of an aerial vehicle safety apparatus according to a first embodiment of the present invention.

As illustrated in FIG. 1, an aerial vehicle safety apparatus 100 according to the present embodiment includes a piston member 10 as a sliding member, a cylinder 14 that accommodates the piston member 10 and is provided with a hole 13 through which the piston member 10 protrudes outward (upward in FIG. 1) at time of operation, a push-up member 15 that is pushed up in one direction (upward in FIG. 1) by the piston member 10, an expandable object 16 that is pushed up while being supported by the push-up member 15, a gas generator (micro gas generator or the like) 17 as a power source that moves the piston member 10 in the cylinder 14, and a first member 18 and a second member 21 that serve as a cylindrical container that accommodates the piston member 10, the cylinder 14, the push-up member 15, the expandable object 16, and the gas generator 17. Here, as a modification, an elastic body such as a spring or a magnetic body such as magnetism may be used as a power source instead of the gas generator 17.

The container and the push-up member 15 include a fiber-reinforced member (member containing a fiber-reinforced composite material as a main component) using a thermosetting resin or a thermoplastic resin and a fiber bundle or a fiber yarn including glass fiber, carbon fiber, or the like. Here, typical examples of the thermosetting resin that can be used include thermosetting resins represented by phenol resins, urea resins, melamine resins, unsaturated polyester resins, epoxy resins, polyimide resins, vinyl ester resins, cyanate ester resins and the like. Typical examples of the thermoplastic resin include polyamide resins, polyolefin resins, acrylic resins, polyester resins, polymethyl methacrylate, polystyrene resins, acrylonitrile-butadiene-styrene copolymer synthetic resins, vinyl chloride resins, nylon 6, nylon 66, polyamideimide, polyetherimide, polycarbonate, polyacetal, polyphenylene oxide, and polyphenylene sulfide. These resins may be used alone or as a mixture.

At least one additive selected from the group consisting of graphite, molybdenum disulfide, hexagonal boron nitride, a fluoropolymer, and a silicone base material may be applied to a surface of the container and a surface in contact with the container of the push-up member 15 in order to reduce a coefficient of dynamic friction and a coefficient of static friction. In particular, as a fluoropolymer, polytetrafluoroethylene (PTFE); fluorinated ethylene propylene (FEP); perfluoroalkoxy polymer (PFA); perfluoromethyl alkoxy polymer (MFA); Polyvinylidene fluoride (PVDF); polyethylene tetrafluoroethylene (ETFE); polyethylene chloride trifluoroethylene (ECTFE); and at least one fluoropolymer selected from the group consisting of polymers of tetrafluoroethylene, hexafluoropropylene, and vinylidene fluoride (THV).

The gas generator 17 is disposed below a body 11 described later of the piston member 10 in a state of being press-fitted into an opening end below the cylinder 14, in a state of being caulked and fixed to the cylinder 14, or in a state of being welded and fixed to the cylinder 14. A lower part of the cylinder 14 is fixed to a bottom of the first member 18.

The piston member 10 includes the body 11 having a portion with an outer diameter substantially equal to an inner diameter of the cylinder 14, and includes a rod 12 connected to the body 11, extending upward, and having a smaller diameter than the body 11. Note that the body 11 and the rod 12 may be integrated. An upper end of the rod 12 is fixed to an inner surface of an upper end of a bottomed cylindrical portion 19 (an example of a columnar member) (described later) of the push-up member 15 via the hole 13 of the cylinder 14. A stopper 23 disposed so as to surround a part of the rod 12 of the piston member 10 is provided in an upper inner part of the cylinder 14. That is, the rod 12 is disposed in a state of being inserted through the stopper 23. As a result, when the piston member 10 moves upward, the body 11 comes into contact with the stopper 23 and stops, and thus the body 11 is not released outward from inside of the cylinder 14.

As illustrated in FIG. 1, the push-up member 15 is a hat-shaped member and includes a bottomed cylindrical portion 19 (an example of the columnar member) disposed so as to cover a part of the cylinder 14, that is, an outer part of the cylinder 14 except for the opening end at which the gas generator 17 is disposed, and the push-up member 15 includes a support 20 having a disc shape, provided as a flange at an opening edge of the bottomed cylindrical portion 19, and supporting the expandable object 16. In such a configuration, a bottom of the support 20 is provided so as to abut on an inner surface the bottom of the first member 18 serving as a bottom of the container in an initial state. The support 20 and the first member 18 need not be in contact with each other. An outer periphery of the support 20 is formed so as not to be in contact with an inner side of the first member 18. A thickness of a bottom of the bottomed cylindrical portion 19 may be larger than a thickness of a cylindrical portion of the bottomed cylindrical portion 19 in order to increase strength.

Figure 2:
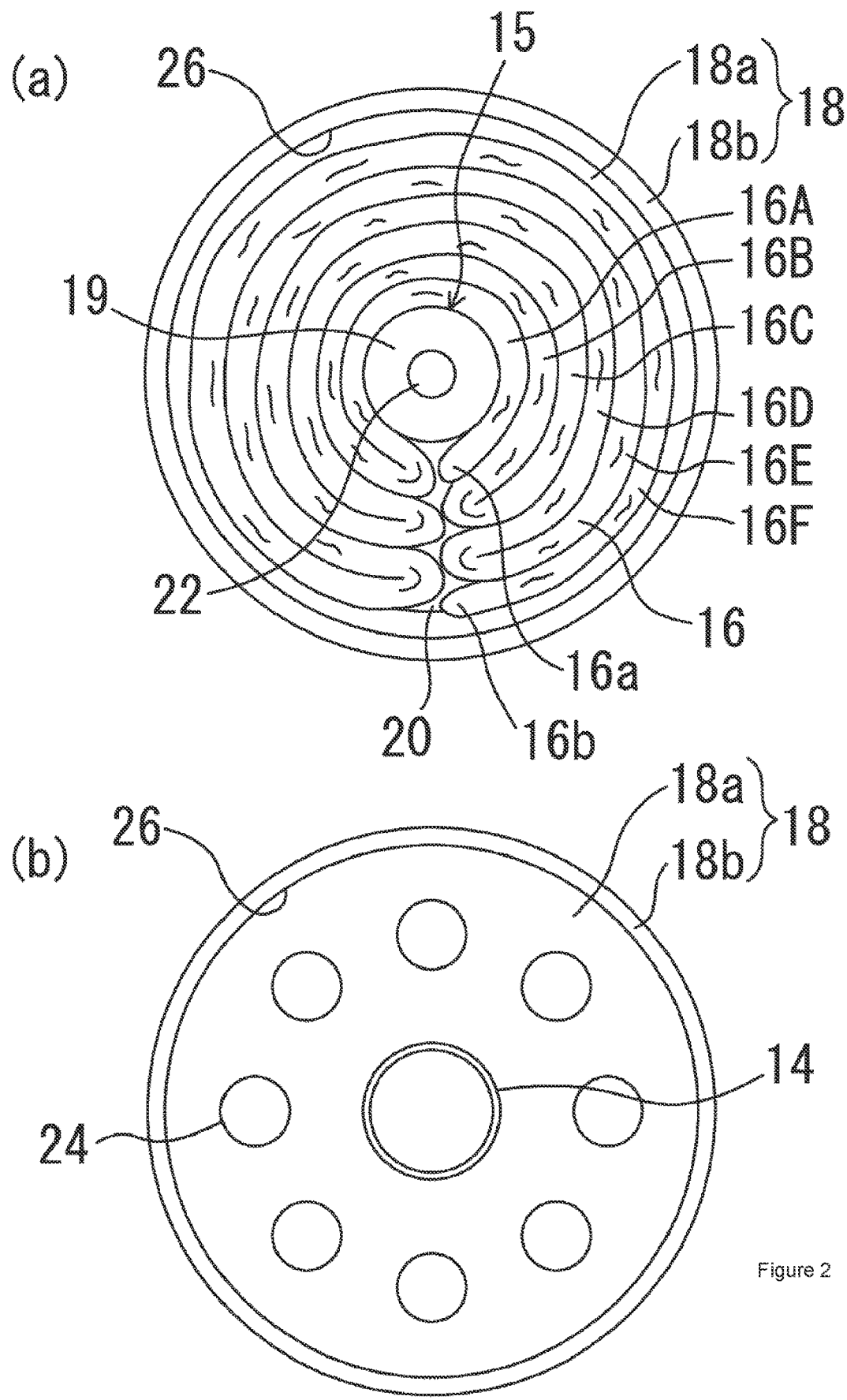
FIG. 2(a) is a plan view of a first member and a cylinder in a state where a second member of a container is removed from the aerial vehicle safety apparatus in FIG. 1.
FIG. 2(b) is a plan view of the first member of the container in the aerial vehicle safety apparatus in FIG. 1.

As illustrated in FIGS. 2(a) and 2(b), the first member 18 is a bottomed cylindrical member having a bottom 18a and a cylindrical side wall 18b. As illustrated in FIGS. 1 and 2(b), the bottom of the first member 18 is provided with a plurality of vent holes 24 communicating the inside and the outside of the first member 18. At the vent holes 24, when the push-up member 15 rapidly moves in the first member 18, negative pressure is generated in a region between the push-up member 15 and a bottom surface of the first member 18. The negative pressure makes it difficult to move the push-up member 15. Therefore, by providing the vent holes 24, the phenomenon of negative pressure can be reduced, and the push-up member 15 can be smoothly moved. By appropriately adjusting an opening area of the vent holes 24 along with output adjustment of the gas generator 17, it is possible to control ejection speed and ejection distance of the expandable object 16.

The second member 21 is a member serving as a top of the container, and is a bottomed short cylindrical lid member having a bottom 21a and a cylindrical side wall 21b with a second opening 27 detachably fitted to a first opening 26 on an opposite side of the bottom 21a. The second opening 27 and the first opening 26 can be joined by fitting due to a shape difference or by using a fastener.

Figure 3:
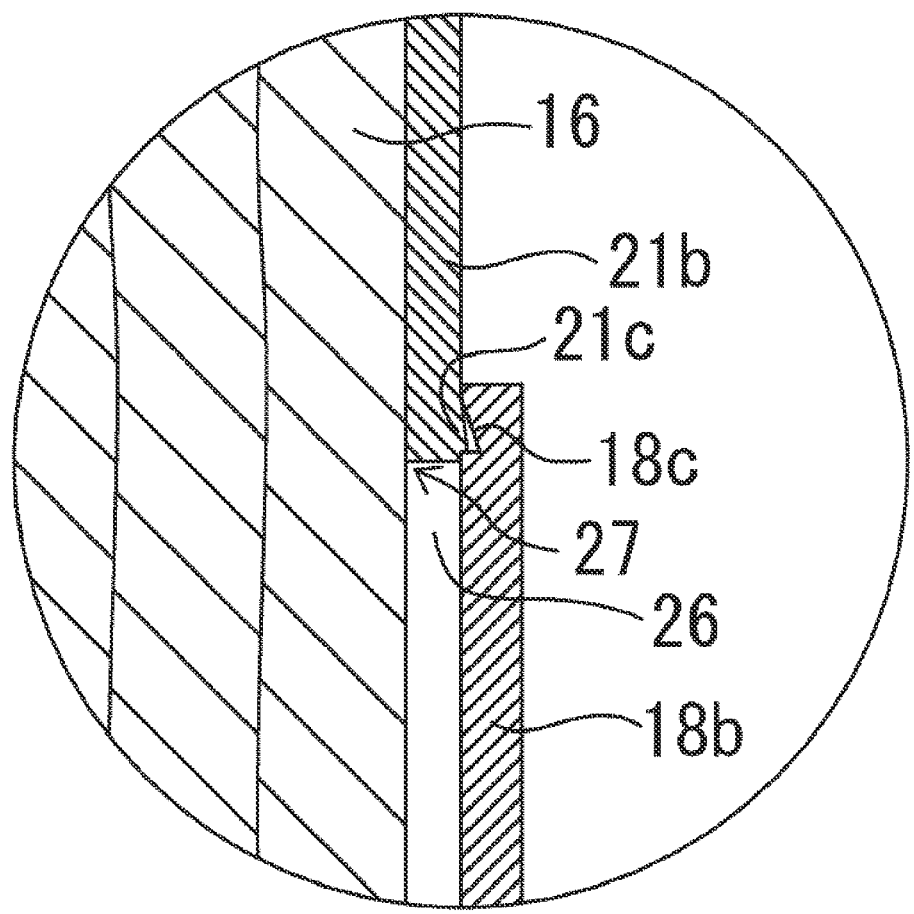
FIG. 3 is a partially enlarged view of the aerial vehicle safety apparatus in FIG. 1.
Figure 4:
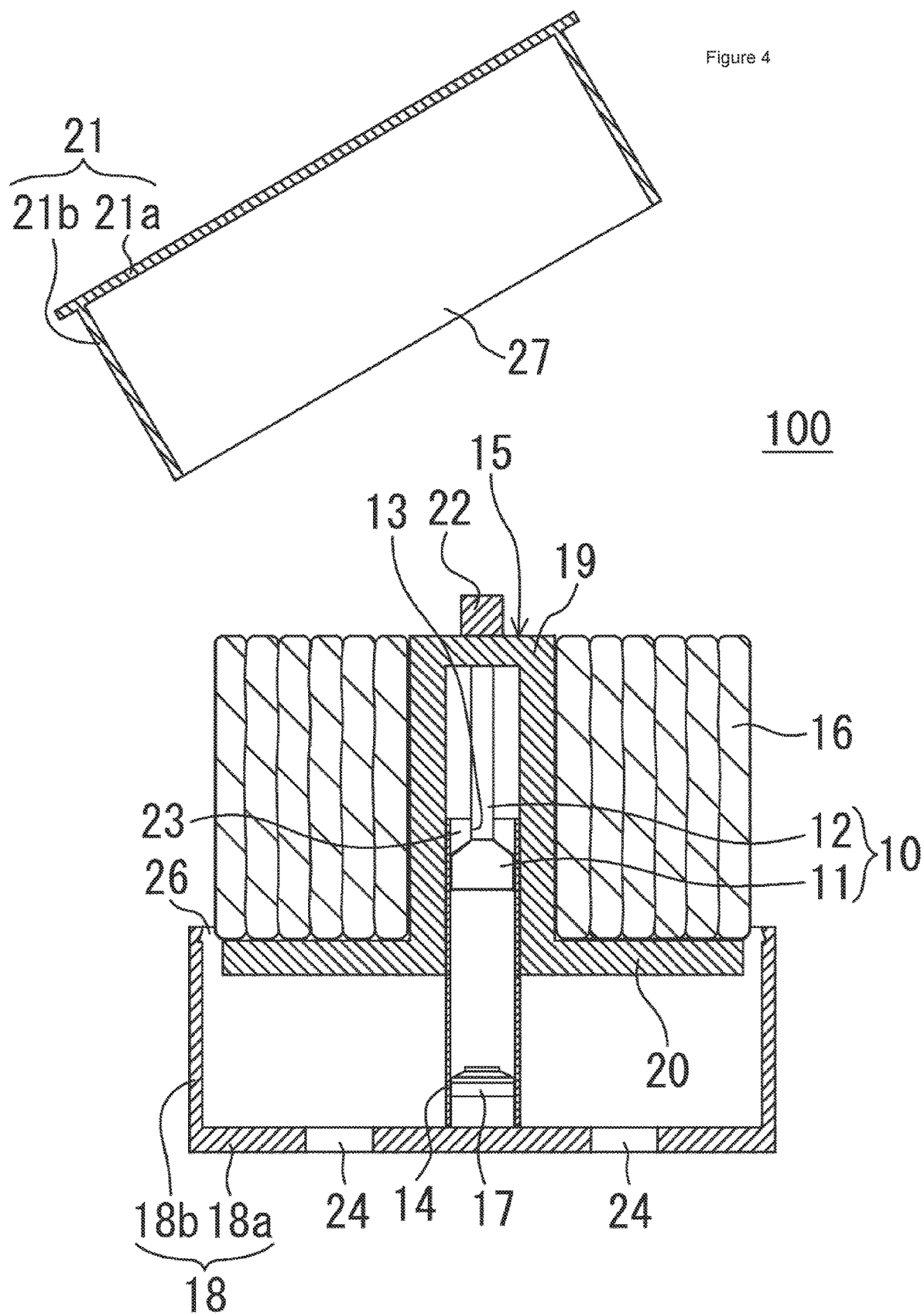
FIG. 4 is a schematic sectional view for describing operation of the aerial vehicle safety apparatus in FIG. 1.

Here, as illustrated in FIG. 3, the first opening 26 and the second opening 27 may be joined by a snap-fit method (a kind of mechanical joining method in which fitting is performed by utilizing elasticity of a material) in which fitting is performed from an outer diameter side of the second opening 27 of the second member 21 to an inner diameter side of the first opening 26 of the first member 18. Specifically, as illustrated in FIG. 3, a protrusion 21c is provided on an outer periphery of the second opening 27, and a recess 18c with which the protrusion 21c meshes is provided on an inner periphery of the first opening 26 of the first member 18. As a result, not only the first member 18 and the second member 21 can be fitted to each other to easily fix the second member 21 to the first member 18, but also at the time of operation, the push-up member 15 pushed up by a force generated by the gas generator 17 pushes up the second member 21 via the support 22 and releases the fixation by removing the meshed protrusion 21c from the recess 18c, and the second member 21 is removed from the first member 18 as illustrated in FIG. 4. Therefore, the expandable object 16 can be smoothly ejected. Here, as a modification, a snap-fit system may be used in which the second opening 27 of the second member 21 is fitted to an outer diameter of the first opening 26 of the first member 18 from an inner diameter side (that is, a diameter of the second member 21 is larger than a diameter of the first member 18). Further, the support 22 may include resin, but preferably includes metal in order to have higher strength.

The expandable object 16 is, for example, an umbrella portion of a parachute or a canopy of a paraglider. The expandable object 16 is accommodated in the container including the first member 18 and the second member 21 by the following method. First, for example, in a case where the expandable object 16 is a parachute, with a part to be a vertex of the expandable object 16 being expanded as one end, parts to which a plurality of lines 25 (a string-like coupling member that couples the container, an airframe 31 of an aerial vehicle 30 described later, or the like with the expandable object 16) illustrated in FIG. 5(a) are connected are collected to be in an elongated state.

Figure 5:
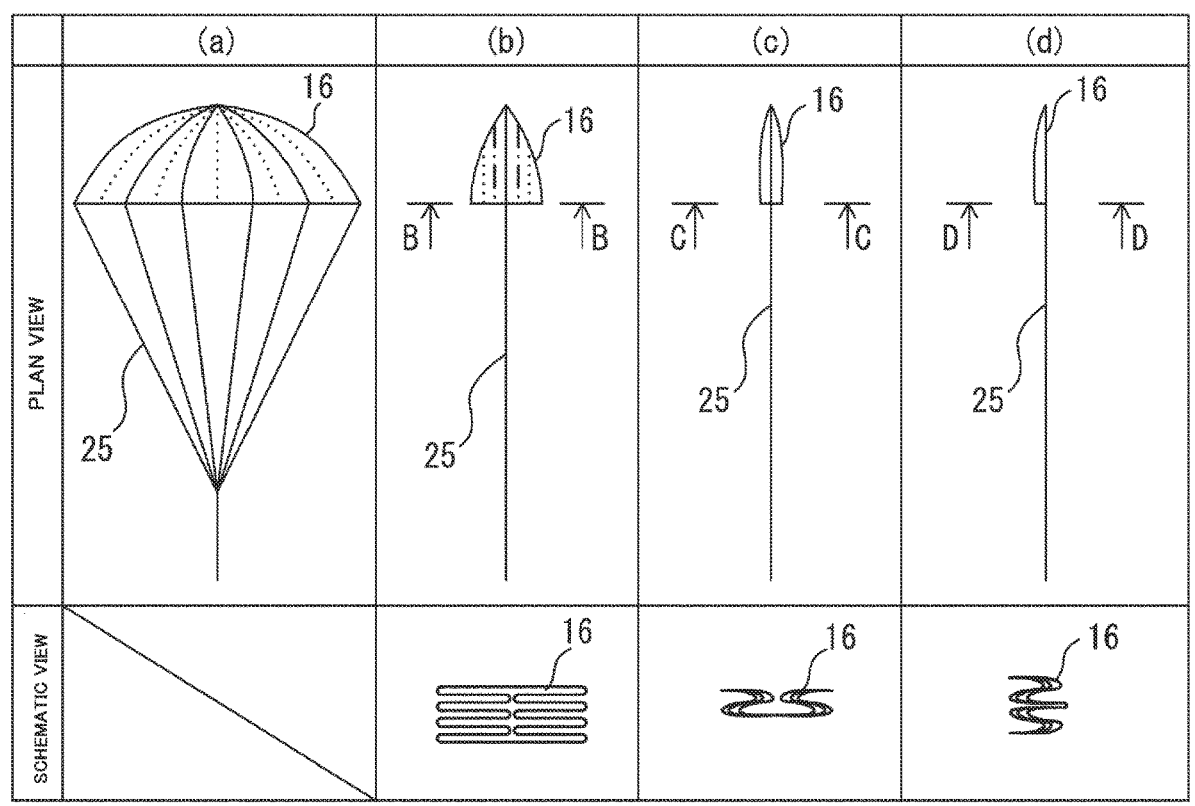
FIG. 5 is a schematic view for describing a manner of folding an expandable object to be accommodated in the container of the aerial vehicle safety apparatus in FIG. 1.

At this time, as illustrated in FIG. 5, the expandable object 16 is preferably folded to be in an elongated state. Specific description is as follows. First, as illustrated in FIG. 5(a) which is a plan view (as viewed from a side) of the expandable object (parachute), the expandable object 16 (parachute) is folded with dotted lines as mountains and solid lines between the dotted lines as valleys so as to be in a state illustrated in FIG. 5(b) (bilaterally symmetrical). At this time, the plurality of lines 25 are collected and arranged in a straight line. The next step will be described with reference to a schematic view in FIG. 5(b). It is preferable to align an end of the expandable object 16 at a position B-B in the plan view in FIG. 5(b). This allows air to easily enter the expandable object 16 at time of expansion and facilitates fast expansion.

The schematic view in FIG. 5(b) is a view taken in a direction of B-B arrow of the plan view in FIG. 5(b) and is a schematically illustrated view. With dotted lines of the expandable object 16 in the plan view in FIG. 5(b) as mountains and with alternate long and short dash lines as valleys, the expandable object 16 is folded such that a cross section on the right side of a center of the expandable object 16 in the drawing has a substantially S-shape and a cross section on the left side of the center of the expandable object 16 in the drawing has an inverted substantially S-shape (so as to be in a state in FIG. 5(c) (bilaterally symmetrical)). Here, a schematic view in FIG. 5(c) is a view taken in a direction of C-C arrow of a plan view in FIG. 5(c) and is a schematically illustrated view. Finally, with a center line of the expandable object 16 in the plan view in FIG. 5(c) as a mountain, the expandable object 16 is folded so as to be in a state illustrated in FIG. 5(d). Here, the schematic view in FIG. 5(d) is a view taken in a direction of arrows D-D in a plan view in FIG. 5(d), and is a schematically illustrated view. Then, the expandable object is accommodated in the first member 18 and the second member 21 serving as the container of the aerial vehicle safety apparatus 100 as follows in a state where the plurality of lines 25 are collected. The lines 25 may be accommodated in the folded parachute, and the expandable object 16 may be accommodated in the container including the first member 18 and the second member 21.

That is, one end of the lines 25 is connected to the first member 18, the support 20, or the airframe 31, and the lines 25 are bundled and placed in a bellows shape or a substantially figure-of-eight shape on the support 20 of the push-up member 15. Then, as illustrated in FIG. 2(a), a first end 16a (an end to which the lines 25 are connected) of the expandable object 16 is wound around a side surface of the bottomed cylindrical portion 19 of the push-up member 15 to reach the first end 16a, and a first layer 16A of the expandable object 16 is formed. Thereafter, while the first layer 16A thus formed is held, an unwound part of the expandable object 16 is folded back in the opposite direction and wound by one round to the first end 16a while overlapping the first layer 16A of the expandable object 16 in a radial direction to form a second layer 16B. In the same manner, while the first layer 16A and the second layer 16B thus formed are held, an unwound part of the expandable object 16 is folded back in the opposite direction and wound by one round so as to overlap the second layer 16B of the expandable object 16 in the radial direction to form a third layer 16C. A fourth layer 16D and a fifth layer 16E are formed in the same manner, and finally, a sixth layer 16F including a second end 16b of the expandable object 16 is formed in the same manner.

Here, for the sake of convenience, each of the drawings illustrates a state in which the expandable object 16 is accommodated such that an outer side of the expandable object 16 is not in contact with the inner side of the first member 18 when the expandable object 16 is wound. However, since a base cloth of the expandable object 16 includes a relatively flexible material (for example, a cloth using a canvas, a polyamide synthetic resin fiber, a polyester resin, a polyolefin resin, or the like), in practice, an outer periphery of the expandable object may come into contact with an inner side of the side wall 18b of the first member 18 or the like.

In the above configuration, when the gas generator 17 is operated, for example, at time of a fall of the aerial vehicle or the like equipped with the aerial vehicle safety apparatus 100, the piston member 10 is propelled upward in the cylinder 14 by pressure of gas generated by the operation. Thus, the push-up member 15 having the bottomed cylindrical portion 19 connected to the rod 12 of the piston member 10 is propelled upward in the first member 18. Then, the push-up member 15 pushes up the second member 21 via the support 22, removes the meshed protrusion 21c from the recess 18c, and releases the fixation (joint) between the first opening 26 and the second opening 27. In this way, each part associated with operation functions as a removal mechanism that removes the second member 21 from the first member 18. Thereafter, by receiving a propulsive force of the push-up member 15, the expandable object 16 is smoothly and quickly ejected outward (upward on the sheet of FIG. 1) from inside of the first member 18. At this time, since the expandable object 16, which is folded as illustrated in FIG. 2(a), is expanded smoothly and quickly after ejection.

Figure 6:
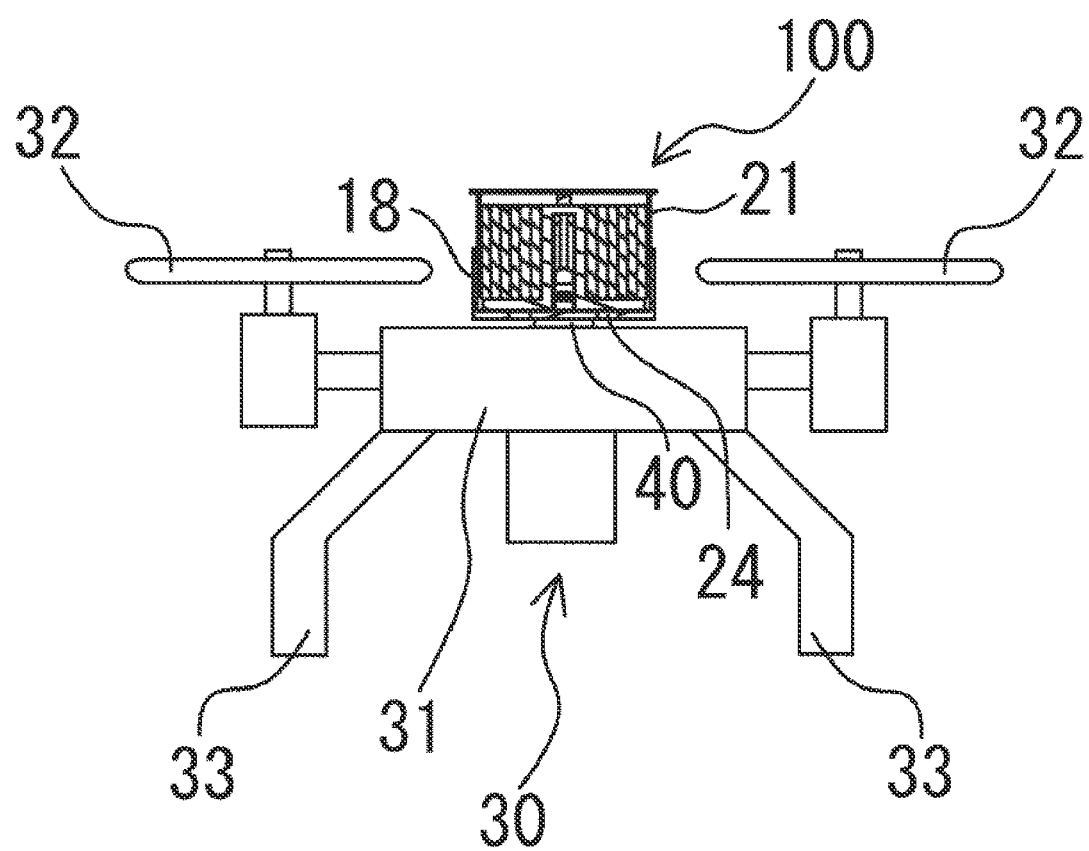
FIG. 6 is a diagram of an aerial vehicle to which the aerial vehicle safety apparatus in FIG. 1 is applied.

As illustrated in FIG. 6, the aerial vehicle safety apparatus 100 is connected and fixed to the airframe 31 of the aerial vehicle 30 via a coupling member 40. At this time, as illustrated in FIG. 6, the coupling member 40 connects the first member 18 and the airframe 31 at a position not to close the vent holes 24. Therefore, the aerial vehicle 30 includes the airframe 31, the aerial vehicle safety apparatus 100 joined to the airframe 31, one or more propulsion mechanisms (for example, propellers) 32 joined to the airframe 31 to propel the airframe 31, and a plurality of legs 33 provided in a lower part of the airframe 31. Here, in practice, a socket for energization is fitted to an electrode (not shown) in a lower part of the gas generator 17, but for convenience of description, the socket is omitted in FIG. 1.

As described above, in the present embodiment, since a part (the second member 21) of the side wall of the container serving as frictional resistance at the time of operation is removed, it is possible to provide the aerial vehicle safety apparatus 100 having a simple configuration and capable of ejecting and expanding the expandable object 16 to the outside of the container smoothly and quickly.

The expandable object 16 is folded such that a force to expand in an outer radial direction of the container (the first member 18 and the second member 21) is relatively not applied in the initial state. As a result, since the expandable object 16 can exist in a lump state until a line tension is applied after ejection, air resistance can be made relatively small, and the expandable object 16 is less likely to be subjected to disturbance (such as an influence of wind) at time of ejection.

Since the first member 18 and the second member 21 are joined by the snap-fit method, when the second member 21 is attached to the first member 18, the second member can be prevented from being detached from the first member by a slight impact. The method of joining the second member 21 to the first member 18 is not limited to the snap-fit method, and other methods may be adopted.

SECOND EMBODIMENT

Figure 7:
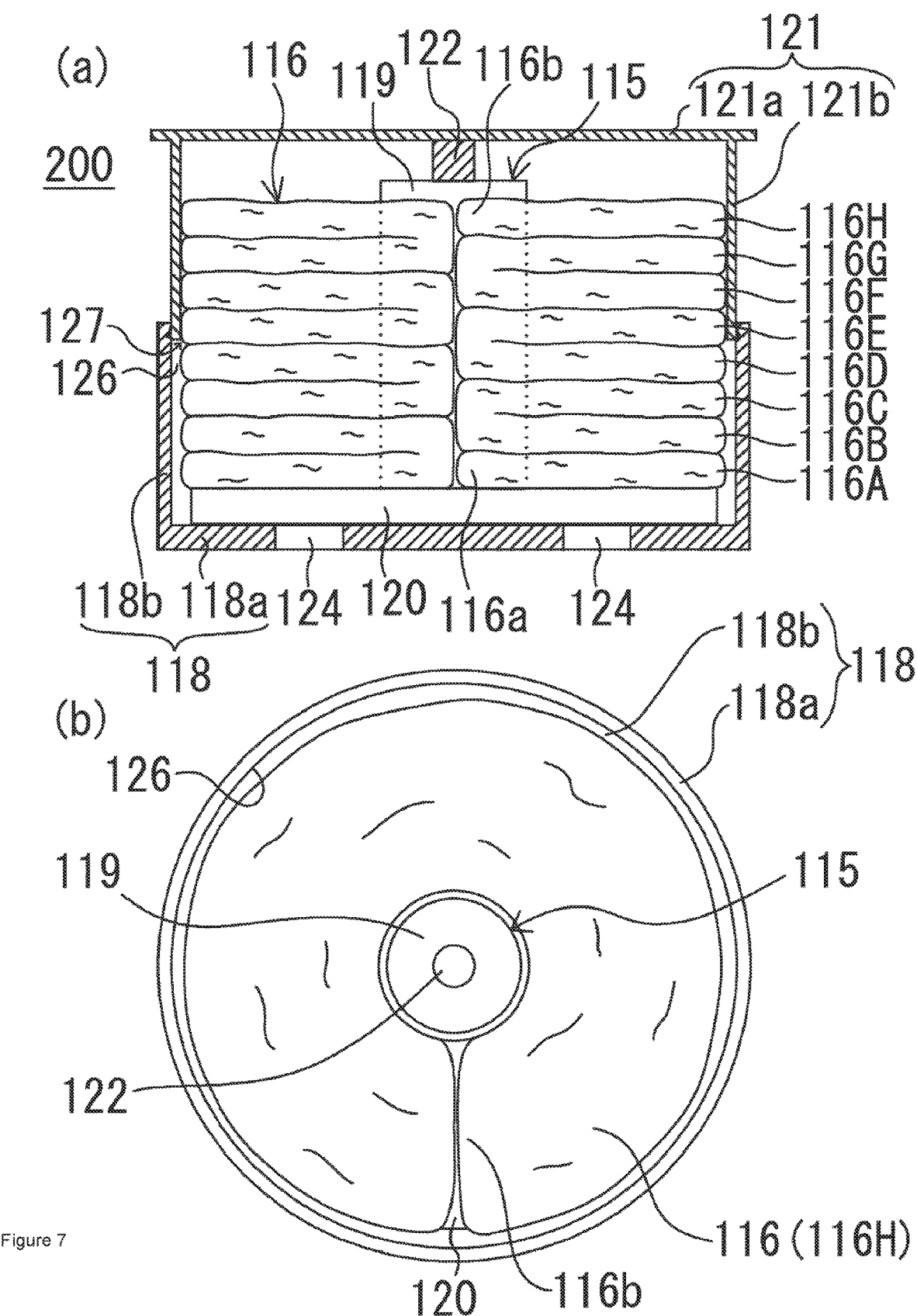
FIG. 7 is a schematic sectional view of an aerial vehicle safety apparatus according to a second embodiment of the present invention.

Next, an aerial vehicle safety apparatus according to a second embodiment of the present invention will be described with reference to FIG. 7. In the present embodiment, reference signs having the same numbers in the last two digits as those in the first embodiment are similar, and thus the description thereof may be omitted. Parts that are not described are similar to the aerial vehicle safety apparatus and the aerial vehicle according to the first embodiment, and thus the description thereof may be omitted.

In an aerial vehicle safety apparatus 200 according to the present embodiment, a state in which an expandable object 116 is accommodated in the container is different from a state in which the expandable object 16 is accommodated in the first embodiment, but the other parts are similar. Note that the expandable object 116 and the expandable object 16 become parachutes having the same shape after expansion.

The expandable object 116 is accommodated in a container including a first member 118 and a second member 121 by the following method. First, for example, in a case where the expandable object 116 is a parachute, the expandable object is folded so as to be in the state of FIG. 5(d) as in the first embodiment. Then, the expandable object is accommodated in the first member 118 and the second member 121 serving as the container of the aerial vehicle safety apparatus 200 as follows in a state where a plurality of lines (similar to the lines 25 in the first embodiment, not shown) are collected.

The lines may be accommodated in the folded expandable object 116, and the expandable object 116 may be accommodated in the first member 18 and the second member 21.

That is, one end of the lines is coupled to the first member 118, a support 120, or an airframe of an aerial vehicle (similar to the airframe of the aerial vehicle in the first embodiment, not shown), and the lines are placed on the support 120 of the push-up member 115. Thereafter, as shown in FIG. 7(b), a first end 116a (an end to which the line is connected) of the expandable object 116 is placed on an upper surface of the support 120 of the push-up member 115, and then is extended counterclockwise around a bottomed cylindrical portion 119 to reach the first end 116a and form a first layer 116A of the expandable object 116. Subsequently, while the formed first layer 116A is held, a part of the expandable object 116 not in contact with the support 120 is folded back in the opposite direction, and while overlapping the first layer 116A of the expandable object 116 in an axial direction of the bottomed cylindrical portion 119, the part is extended clockwise around the bottomed cylindrical portion 119 to reach the first end 116a and form a second layer 116B. In the same manner, while the first layer 116A and the second layer 116B are held, a part of the expandable object 116 not having formed a layer is folded back in the opposite direction, and while overlapping the second layer 116B of the expandable object 116 in the axial direction of the bottomed cylindrical portion 119, the part is extended counterclockwise around the bottomed cylindrical portion 119 by one round to form a third layer 116C. A fourth layer 116D, a fifth layer 116E, a sixth layer 116F, and a seventh layer 116G are formed in the same manner, and finally, an eighth layer 116H including a second end 116b of the expandable object 116 is formed in the same manner.

Here, the expandable object 116 is accommodated such that an outer side of the expandable object 116 is not in contact with an inner side of the first member 118. The expandable object 116 may be accommodated such that the outer side of the expandable object 116 is in contact with the inner side of the first member 118.

In the above configuration, when a gas generator (similar to the gas generator 17, not shown) is operated, for example, at time of a fall of the aerial vehicle or the like equipped with the aerial vehicle safety apparatus 200, a piston member (similar to the piston member 10, not shown) is propelled upward in a cylinder (similar to the cylinder 14, not shown) by pressure of gas generated by the operation. Thus, the push-up member 115 having the bottomed cylindrical portion 119 connected to a rod (similar to the rod 12, not shown) of the piston member is propelled upward in the first member 118. As a result, the push-up member 115 pushes up the second member 121 via the support 122 and functions as a removal mechanism that removes the second member 121 from the first member 118. Thereafter, by receiving a propulsive force of the push-up member 115, the expandable object 116 is smoothly and quickly ejected outward (upward on the sheet of FIG. 7) from inside of the first member 118. At this time, since the expandable object 116, which is folded as illustrated in FIG. 7, is expanded smoothly and quickly after ejection.

The above configuration exerts similar effects to the first embodiment.

As described above, the embodiments of the present invention have been described with reference to the drawings. However, the specific configuration of the present invention shall not be interpreted as to be limited to the embodiments. The scope of the present invention is defined not by the above embodiments but by claims set forth below, and shall encompass the equivalents in the meaning of the claims and every modification within the scope of the claims. For example, the expandable object according to the embodiments may be packaged with a package that is broken or disassembled at time of expansion.

In the embodiments, the gas generator is adopted as the power source, but the configuration is not limited as long as the sliding member can apply a driving force for propelling the inside of the cylinder to the sliding member. For example, an elastic body such as a spring or a magnetic body such as gas or magnetism may be adopted.

In the embodiments, the support of the push-up member is provided so as to abut on the bottom of the first member. However, the present invention is not limited thereto. For example, the support may be disposed near a middle of the rod of the piston member in a length direction.

In the embodiments, the upper end of the rod is fixed to the inner surface of the upper end of the bottomed cylindrical portion of the push-up member, but the present invention is not limited thereto. The upper end of the rod is not required be fixed to the inner surface.

In the embodiments, the second member may be automatically removed from the first member by a drive device such as a motor in accordance with the operation of the gas generator.

In the embodiments, the container has a cylindrical shape. However, the present invention is not limited to this, and the container may have another shape such as a quadrangular cylinder.

The piston member in the embodiments may be configured as a telescopic structure.

In the embodiments, the parachute has been described as an example of the expandable object, but the present invention is not limited thereto. An expandable object including a lift generation member may be ejected as the expandable object. Examples of the lift generation member include a parafoil, a triangular parachute, a Rogallo parachute, a single surface parachute, a double-cloth paraglider, an airplane wing, a propeller, and a balloon. When the lift generation member has a control line, the aerial vehicle safety apparatus desirably includes a steering mechanism capable of changing an inclination angle of the ejected lift generation member using the control line. This steering mechanism includes a plurality of reels for winding up a plurality of control lines coupled to the lift generation member and includes a motor serving as power of the reels, for example. By winding up or pulling out the control lines by driving the motor, it is possible to appropriately pull the lift generation member or loosen a tension.

In the embodiments, the vent holes are provided in the bottom of the container, but the present invention is not limited to this position. Any position may be adopted as long as the negative pressure generated between the container and the push-up member at the time of operation can be suppressed.

The cylinder, the power source, and the container in the embodiments are preferably coupled or fixed to the airframe by a rubber band, a belt, a string, or other means (mechanical joint, bolt, fastener, or adhesive).

In the embodiments, a shape of the support supporting the expandable object may be any of a disk shape (including circle and ellipse), a polygon, or a radial shape. When the shape of the support is an ellipse or a polygon, an inner surface of the container is desirably formed along the outer periphery of the support.

In the embodiments, in a case where a fastener is used for joining the second opening 27 and the first opening 26, there may be provided a release mechanism (for example, a mechanism that uses a driving force of a motor and members transmitting the driving force, such as a cam and a gear) that automatically releases coupling between the second opening 27 and the first opening 26 by the fastener in accordance with operation of the aerial vehicle safety apparatus.

In the embodiments, the configuration has been described in which the expandable object is wound around the bottomed cylindrical portion of the push-up member in the container, but the present invention is not limited to this configuration. For example, the present invention can be applied to any apparatus as long as the apparatus pushes up an expandable object placed on a launcher (a kind of push-up member) provided in a container in response to the operation of the launcher and ejects the expandable object to the outside of the container.

EXAMPLES

Figure 8:
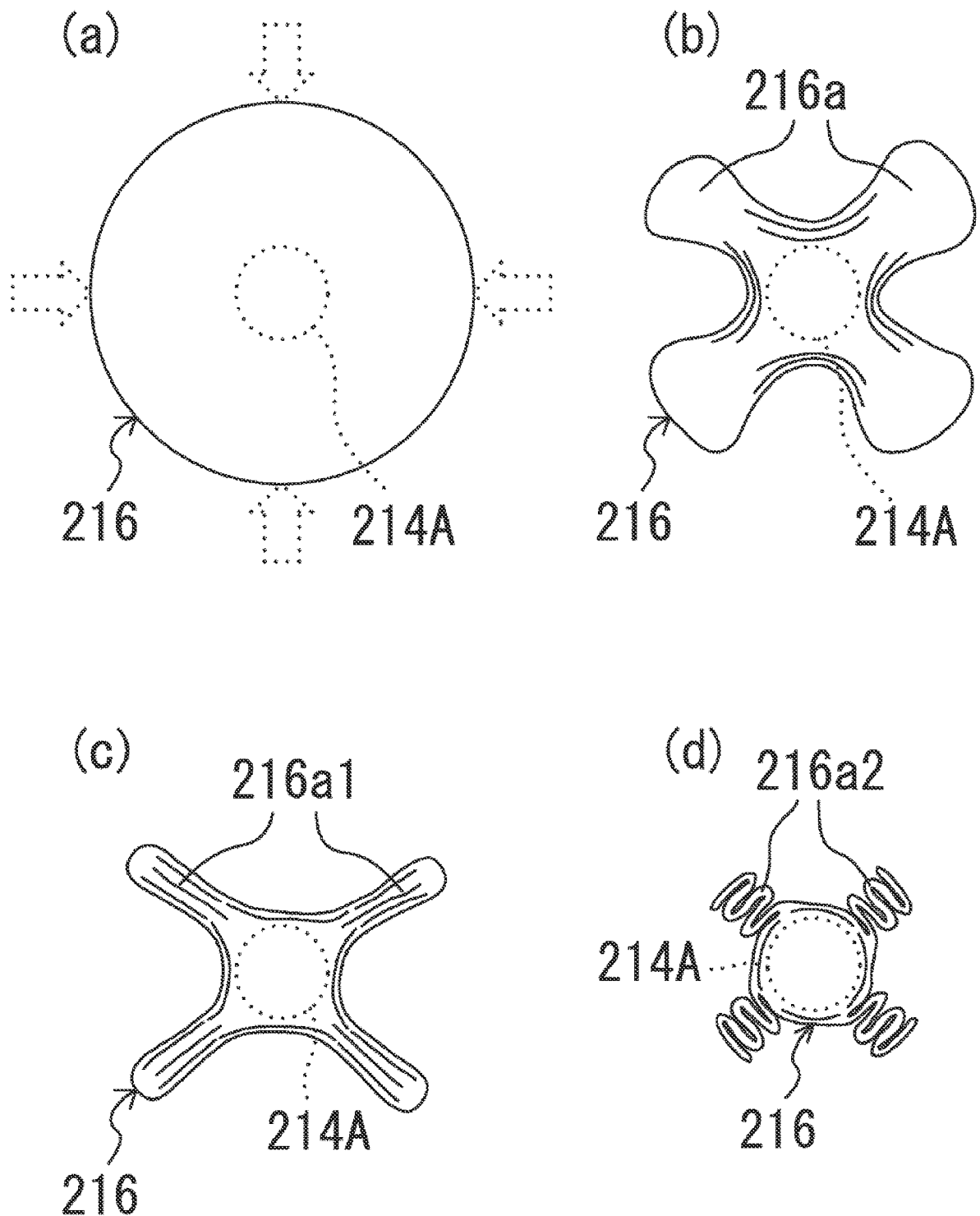
FIG. 8 is a diagram for describing a manner of folding an expandable object to be accommodated in a container of an aerial vehicle safety apparatus in Comparative Example.

Next, examples according to the present invention will be described. Specifically, an aerial vehicle safety apparatus having the same configuration as the configuration of the second embodiment in which an accommodation volume of the container is changed to three types (Examples 1 to 4) and an aerial vehicle safety apparatus having the same configuration as the configuration of Example 2 except for using the expandable object folded in the manner of folding illustrated in FIG. 8 (Comparative Example) are manufactured, and experiments of ejection and expansion of the expandable object performed for each apparatus and results of the experiments will be described. In FIG. 8, reference signs having the same numbers in the last two digits are the same as those in the second embodiment, and thus the description thereof may be omitted. Parts that are not described are similar to the aerial vehicle safety apparatus and the aerial vehicle according to the second embodiment, and thus the description thereof may be omitted.

Here, description will be made of the manner of folding an expandable object 216 in the initial state to be accommodated in the container of the aerial vehicle safety apparatus in Comparative Example. First, before being accommodated in the container, as illustrated in FIG. 8(*a*), the expandable object 216 is installed in a cylindrical member 214A having the same shape as the cylinder, and a force is applied to lightly crush the expandable object 216 from four directions of outlined dotted arrows to form four projections 216*a* having a projecting shape illustrated in FIG. 8(*b*). Next, a force is applied to lightly crush both sides of the projections 216*a* to form a projection 216*a*1 in an elongated state from the projections 216*a* as illustrated in FIG. 8(*c*). Subsequently, the projection 216*a*1 is folded so as to have a waveform in which unevenness is repeatedly formed in a lateral direction with respect to a horizontal direction, and a wavy portion 216*a*2 is formed as illustrated in FIG. 8(*d*). The expandable object 216 folded in this manner was covered with a package (not shown) while being held, and accommodated in the container of the aerial vehicle safety apparatus used in the experiment.

In the experiment, time from the operation to the application of the line tension (time until the lines reach a maximum height at which the lines are fully extended and stretched (maximum height arrival time)) was measured.

Each experiment was performed three times in Examples 1 to 3, twice in Example 4, and twice in Comparative Example. The time during which the line tension was applied was measured using a highly sensitive camera and moving image analysis (motion analysis) software (TEMA manufactured by PHOTRON LIMITED). Specifically, a state from operation until the lines were fully extended and stretched was photographed with the high-sensitivity camera, and the time when the line tension was applied was calculated from moving image information obtained by photographing using the software.

The results of the experiments are shown in Table 1 below.

TABLE 1

| | Manner of folding | Accommodation volume of container (mm$^2$) | Maximum height arrival time (s) | Average time (s) |
|---|---|---|---|---|
| Example 1-1 | Similar to second embodiment | 2322 | 0.36 | 0.35 |
| Exemple 1-2 | | | 0.36 | |
| Example 1-3 | | | 0.36 | |
| Example 2-1 | | 2030 | 0.36 | 0.36 |
| Example 2-2 | | | 0.36 | |
| Example 2-3 | | | 0.36 | |
| Example 3-1 | | 1627 | 0.29 | 0.31 |
| Example 3-2 | | | 0.32 | |
| Example 3-3 | | | 0.32 | |
| Example 4-1 | | 1336 | 0.30 | 0.29 |
| Exemple 4-2 | | | 0.28 | |
| Comparative Example 1-1 | See FIG. 8 | 2030 | 0.43 | 0.43 |
| Comparative Example 1-2 | | | 0.43 | |

From Table 1, it was found that average values of the maximum height arrival times of Examples 1 to 4 were significantly shorter than the average value of the maximum height arrival times of Comparative Examples. That is, it was found that, in Examples 1 to 4, the time until the state in which the line tension is applied such that the expandable object is easily expanded can be significantly reduced as compared with Comparative Example.

REFERENCE SIGNS LIST

10 piston member
11 body
12 rod
13 hole
14 cylinder
15, 115 push-up member
16, 116, 216 expandable object
16*a*, 116*a* first end
16*b*, 116*b* second end
17, 117 gas generator
18, 118 first member
18*a*, 21*a*, 118*a*, 121*a* bottom
18*b*, 21*b*, 118*b*, 121*b* side wall
18*c* recess
19, 119, 219 bottomed cylindrical portion (columnar member)
20, 22, 120, 122 support
21, 121 second member
21*c* protrusion
23, 123 stopper
24, 124 vent hole
25 line 26, 126 first opening
27, 127 second opening
30 aerial vehicle
31 airframe
33 leg
40 coupling member
100, 200, 300 aerial vehicle safety apparatus
214A cylindrical member
216a, 216a1 projection
216a2 wavy portion

The invention claimed is:

1. An aerial vehicle safety apparatus comprising:
an expandable object configured to hold air inside during expansion;
a container that accommodates the expandable object in an initial state;
a hat-shaped member provided in the container and including a columnar member and a flange provided at one end of the columnar member; and
an ejection apparatus that ejects the hat-shaped member and the expandable object from inside of the container to outside of the container at time of operation;
wherein in the initial state, the expandable object is accommodated in the container while being folded into overlapping layers including at least a first layer and a second layer each of which having a first end and a terminal end;
wherein said first layer is positioned at a predetermined position with respect to the columnar member with said first end of the first layer as a starting end, said first layer extends around a periphery of said columnar member such that said terminal end reaches said first end, and
wherein said second layer is folded such that the first end of said second layer extends from the terminal end of the first layer along a peripheral surface of the first layer and such that said terminal end of said second layer reaches said first end of the second layer.

2. The aerial vehicle safety apparatus according to claim 1, further comprising a coupling member coupling the expandable object to the container or to a body of an aerial vehicle.

3. An aerial vehicle safety apparatus comprising:
an expandable object configured to hold air inside during expansion;
a container that accommodates the expandable object in an initial state;
a hat-shaped member provided in the container and including a columnar member and a flange provided at one end of the columnar member; and
an ejection apparatus that ejects the hat-shaped member and the expandable object from inside of the container to outside of the container at time of operation;
wherein in the initial state, the expandable object is accommodated in the container while being folded into overlapping layers including at least a first layer and a second layer each of which having a first end and a terminal end;
wherein said first layer is positioned at a predetermined position on the flange with said first end of the first layer as a starting end said first layer extends over said flange and around said columnar member such that said terminal end reaches said first end, and
wherein said second layer is folded such that the first end of said second layer extends from the terminal end of the first layer over a surface of the first layer such that said terminal end of said second layer reaches said first end of the second layer.

4. The aerial vehicle safety apparatus according to claim 3, further comprising a coupling member coupling the expandable object to the container or to a body of an aerial vehicle.

5. A method of accommodating an expandable object in an aerial vehicle safety apparatus including:
an expandable object configured to hold air inside during expansion,
a container that accommodates the expandable object in an initial state,
a hat-shaped member provided in the container and including a columnar member and a flange provided at one end of the columnar member, and an ejection apparatus that ejects the hat-shaped member and the expandable object from inside of the container to outside of the container at time of operation, the method comprising at least:
forming a first layer by arranging the expandable object to be positioned at a predetermined position on the flange with one end of the expandable object as a starting end from a state in which the expandable object is collected into an elongated shape, extending the expandable object on the flange by one round about the columnar member from the starting end, and forming a terminal end; and
forming a second layer by folding back the expandable object from the terminal end of the first layer to overlap an outer side of the first layer, further extending the expandable object around the first layer along a peripheral surface of the first layer by one round to reach one end of the first layer, and layering the expandable object on the first layer in a radial direction.

6. A method of accommodating an expandable object in an aerial vehicle safety apparatus including:
an expandable object configured to hold air inside during expansion,
a container that accommodates the expandable object in an initial state, a hat-shaped member provided in the container and including a columnar member and a flange provided at one end of the columnar member, and
an ejection apparatus that ejects the hat-shaped member and the expandable object from inside of the container to outside of the container at time of operation, the method comprising at least:
forming a first layer by arranging the expandable object to be positioned at a predetermined position on the flange with one end of the expandable object as a starting end from a state in which the expandable object is collected into an elongated shape, extending the expandable object on the flange by one round about the columnar member from the starting end, and forming a terminal end; and
after forming the first layer, forming a second layer by folding back the expandable object from the terminal end of the first layer to overlap the first layer on an opposite side of the flange, further extending the expandable object around the columnar member by one round along a surface of the first layer to reach one end of the first layer, and layering the expandable object on the first layer in a direction opposite to the flange.

* * * * *